(12) United States Patent
Weiland et al.

(10) Patent No.: US 6,732,515 B1
(45) Date of Patent: May 11, 2004

(54) TRAVELING-WAVE THERMOACOUSTIC ENGINES WITH INTERNAL COMBUSTION

(75) Inventors: Nathan Thomas Weiland, Blacksburg, VA (US); Ben T. Zinn, Atlanta, GA (US); Gregory William Swift, Sante Fe, NM (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 10/387,688

(22) Filed: Mar. 13, 2003

Related U.S. Application Data
(60) Provisional application No. 60/364,207, filed on Mar. 13, 2002.

(51) Int. Cl.[7] .............................................. F01B 29/10
(52) U.S. Cl. .............................. 60/520; 60/526; 60/721
(58) Field of Search .......................... 60/517, 520, 721, 60/521, 522, 526; 62/6

(56) References Cited

U.S. PATENT DOCUMENTS

| | | | |
|---|---|---|---|
| 4,114,380 A | 9/1978 | Ceperley | 60/721 |
| 4,355,517 A | 10/1982 | Ceperley | 60/721 |
| 5,953,920 A | 9/1999 | Swift et al. | 62/6 |
| 6,032,464 A | 3/2000 | Swift et al. | 60/520 |
| 6,164,073 A | 12/2000 | Swift et al. | 60/721 |
| 6,314,740 B1 * | 11/2001 | De Blok et al. | 62/6 |
| 6,560,970 B1 * | 5/2003 | Swift | 62/6 |
| 6,564,552 B1 * | 5/2003 | Ward et al. | 60/520 |
| 6,578,364 B2 * | 6/2003 | Corey | 62/6 |
| 6,644,028 B1 * | 11/2003 | Swift et al. | 60/516 |

OTHER PUBLICATIONS

"A Pistonless Stirling Engine—The Traveling Wave Heat Engine" Ceperley; 1979.
"Gain and Efficiency of a Short Traveling Wave Heat Engine" Ceperley; 1985.
"Pulsating Combustion" Zinn; 1986; pp. 113–181.
"A Thermoacoustic–Stirling Heat Engine: Detailed Study" Backhaus, et al.; 2000.
"Experiments with a Flow–Through Thermoacoustic Refrigerator" Reid et al.; 2000.
"Thermoacoustics for Liquefaction of Natural Gas" Swift; 2002; pp. 22–26.
"Development of a Thermoacoustic Natural Gas Liquefier" Wollan, et al.; Mar. 2002; pp. 1–8.

* cited by examiner

Primary Examiner—Hoang Nguyen
(74) Attorney, Agent, or Firm—Thomas, Kayden, Horstemeyer & Risley, LLP

(57) ABSTRACT

Thermoacoustic devices are disclosed wherein, for some embodiments, a combustion zone provides heat to a regenerator using a mean flow of compressible fluid. In other embodiments, burning of a combustible mixture within the combustion zone is pulsed in phase with the acoustic pressure oscillations to increase acoustic power output. In an example embodiment, the combustion zone and the regenerator are thermally insulated from other components within the thermoacoustic device.

33 Claims, 8 Drawing Sheets

TRAVELING-WAVE THERMOACOUSTIC ENGINES WITH INTERNAL COMBUSTION

CROSS REFERENCE TO RELATED APPLICATIONS

This application claims the benefit of U.S. provisional patent application Serial No. 60/364,207, filed Mar. 13, 2002, which is incorporated herein by reference in its entirety. Also, co-pending U.S. patent application having U.S. Express Mail Mailing Label Number EV269328365US is incorporated herein by reference in its entirety.

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of contract number F49620-99-C-0054 awarded by the National Defense Science and Engineering Graduate Fellowship, a part of the United States Air Force Office of Scientific Research.

Additionally, this invention was made at least in part with government support under Contract No. W-7405-ENG-36 awarded by the U.S. Department of Energy. The U.S. government has certain rights in the invention.

FIELD OF THE INVENTION

The present disclosure relates generally to the fields of thermoacoustics and combustion and, more particularly, to thermoacoustic devices.

BACKGROUND

Thermoacoustic devices have been used as heat engines and heat pumps. As shown in FIG. 1, one mechanism for manipulating thermoacoustic waves is a conventional traveling wave thermoacoustic driver 100 having a hot heat exchanger 130 and a primary cold heat exchanger 140, which are used to generate a temperature gradient across a regenerator 120. The conventional thermoacoustic driver 100 contains a compressible fluid that is capable of sustaining acoustic oscillations. To convert thermal energy into acoustic energy, acoustic traveling waves are introduced through the top of the conventional thermoacoustic driver 100. At substantially the same time, the primary cold heat exchanger 140 is cooled by passing an ambient temperature (or externally chilled) fluid 180 through pipe 160, and the hot heat exchanger 130 is heated by passing externally heated fluid 170 through pipe 150. The hot heat exchanger 130 and the primary cold heat exchanger 140 set up a temperature gradient in the regenerator 120, which is interposed between the hot heat exchanger 130 and the primary cold heat exchanger 140. The regenerator 120 comprises packing material that is fine enough so that the working fluid in the regenerator 120 is essentially in thermal equilibrium with the packing around it, but not so fine as to prevent the passage of acoustic waves through the regenerator 120.

Pressure oscillations produced by the acoustic traveling wave induce the compressible fluid in the regenerator to move down towards the hot end of the temperature gradient, or up towards the cold end of the temperature gradient. Consequently, when the compressible fluid moves down, the hotter regenerator packing heats and expands the compressible fluid; when the compressible fluid moves up, the colder regenerator packing cools and contracts the compressible fluid. As the acoustic traveling wave passes through the compressible fluid, it imparts time-dependent pressure and velocity oscillations to a small volume of the fluid at the wave's location. Since traveling waves are intrinsically phased such that the peak velocity and the peak pressure occur at substantially the same time, the processes undergone by the small volume of the fluid in the regenerator mimic the thermodynamic cycle of a Stirling engine. The thermodynamic cycle, therefore, results in conversion of thermal energy into mechanical energy. In other words, the traveling wave causes the compression, expansion, and fluid movement, which adds pressure and momentum to the waves, thereby amplifying the acoustic traveling wave as it passes through the regenerator.

As is known in the art, if the direction of the acoustic traveling wave is reversed from the hot heat exchanger 130 to primary cold heat exchanger 140, then the conventional thermoacoustic driver 100 may be used as a heat pump for refrigeration, air conditioning, or other cooling or heating applications. Since the operation of the conventional thermoacoustic driver 100 is known in the art, further discussion of the conventional thermoacoustic driver 100 is omitted here.

FIG. 2 is a diagram showing a cross-sectional view of a thermoacoustic Stirling heat engine (TASHE) 200 having a conventional thermoacoustic driver. As shown in FIG. 2, the TASHE 200 comprises a resonator 220, a variable acoustic load 210, and a thermoacoustic driving section 300. In one working example, the TASHE 200 is filled with helium at approximately thirty bars mean pressure. The use of high-pressure helium increases the acoustic power density of the TASHE 200, which permits acoustic effects to prevail over heat conduction losses.

FIG. 3 is a diagram showing, in greater detail, the thermoacoustic driving section 300 of the TASHE 200 from FIG. 2. The thermoacoustic driving section 300 of the TASHE 200 comprises a toroidal acoustic feedback loop (or torus) 315 having a regenerator 330 interposed between a primary cold heat exchanger 325 and a hot heat exchanger 335. As described with reference to FIG. 1, the primary cold heat exchanger 325, the regenerator 330, and the hot heat exchanger 335 are configured to amplify acoustic traveling waves that propagate clockwise through the torus 315. At the junction 350, a portion of the amplified acoustic energy travels to the right towards the resonator 220 and the acoustic load 210, while the remainder is fed back, through the torus 315, to the cold end of the regenerator 330 to be amplified within the regenerator 330. Thus, when the acoustic traveling waves propagate clockwise through the torus 315, the thermoacoustic driving section 300 functions as a heat engine. Conversely, a counter-clockwise propagation of acoustic traveling waves through the torus 315 attenuates the acoustic traveling waves, thereby resulting in a heat pump configuration in which heat is pumped from the primary cold heat exchanger 325 to the hot heat exchanger 335.

Additionally, the torus 315 contains an inertance section 305 and a compliance section 310. These sections 305, 310, along with the regenerator 330, define the properties of the acoustic waves in the thermoacoustic driving section 300. Each of these components 305, 310 and 330, are much shorter than an acoustic wavelength, though their specific geometries create the traveling wave acoustic phasing within the regenerator 330. They are also geometrically configured to reduce the acoustic velocity within the regenerator 330, thereby reducing viscous losses that would normally accompany the passage of an acoustic traveling wave through a conventional thermoacoustic driver 100, as shown in FIG. 1.

The thermoacoustic driving section 300 of the TASHE 200 further comprises a secondary cold heat exchanger 345, which, in conjunction with the hot heat exchanger 335, defines a thermal buffer tube 340. The thermal buffer tube 340 provides thermal isolation between the hot heat exchanger 335 and the rest of the TASHE 200 beyond the cold heat exchangers 325, 345. Since the TASHE 200 is described in greater detail in U.S. Pat. No. 6,032,464 to Swift et al., further discussion of the TASHE 200 is omitted here.

One drawback of the TASHE 200 is that acoustic streaming in the thermoacoustic driving section 300 results in a convection current that travels clockwise around the torus 315, carrying thermal energy away from the regenerator 330 and out the secondary cold heat exchanger 345. Since this degrades the performance of the engine, it is desirable to eliminate or minimize any clockwise mean flow around the torus 315 and through the regenerator 330. As a result, the thermoacoustic driving section 300 of the TASHE 200 comprises a hydrodynamic mass-flux suppressor (or jet pump) 320 that is adjustable to minimize or eliminate any net flow of the compressible fluid around the torus 315. The operation of the mass-flux suppressor 320 relies on turbulence and the viscous dissipation of kinetic energy, so its use in suppressing the clockwise convection current is also accompanied by some dissipation of acoustic energy.

Also, in the TASHE 200, conduction of heat through the walls of the torus 315 can result in significant energy losses. These energy losses are due to heat conduction radially through the walls into the insulation or atmosphere surrounding the torus 315, and also due to axial heat conduction along the walls of the torus 315 between the hot heat exchanger 335 and the cold heat exchangers 325, 345, essentially bypassing the regenerator 330. For higher internal gas pressures as are typically present in the TASHE 200, greater wall thickness is required, which results in greater axial conduction losses. Additionally, cross-flow heat exchangers 325, 335, 345, which are typically used due to geometric constraints, result in sub-optimal heat transfer and potentially enormous thermal stresses, especially in the hot heat exchanger 335.

Given these inefficiencies, a need exists in the industry for more efficient traveling wave thermoacoustic devices.

SUMMARY

The present disclosure provides systems for manipulating acoustic energy.

Briefly described, some embodiments of a system comprise a thermoacoustic driver and a feedback path. In some embodiments, the thermoacoustic driver comprises an inlet conduit, a combustion zone, a regenerator, a cold heat exchanger, and an exhaust port. The inlet conduit is adapted to admit a compressible combustible mixture. The combustion zone is configured to receive the compressible combustible mixture and burn the compressible combustible mixture to generate hot compressible combustion products. The regenerator has a cold side and a hot side, which generate a temperature gradient across the regenerator. The cold side of the regenerator is coupled to the cold heat exchanger. The hot compressible combustion products are directed to the hot side of the regenerator and through the regenerator to produce cold compressible combustion products. The cold compressible combustion products are expelled by the exhaust port. This configuration permits amplification of traveling acoustic waves that propagate through the regenerator from the cold side of the regenerator to the hot side of the regenerator. The feedback path returns a portion of the acoustic energy from the hot side of the regenerator to the cold side of the regenerator for further amplification, and is thermally insulated from the regenerator and the combustion zone.

Other systems, methods, features and/or advantages will be or may become apparent to one with skill in the art upon examination of the following drawings and detailed description. It is intended that all such additional systems, methods, features and/or advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
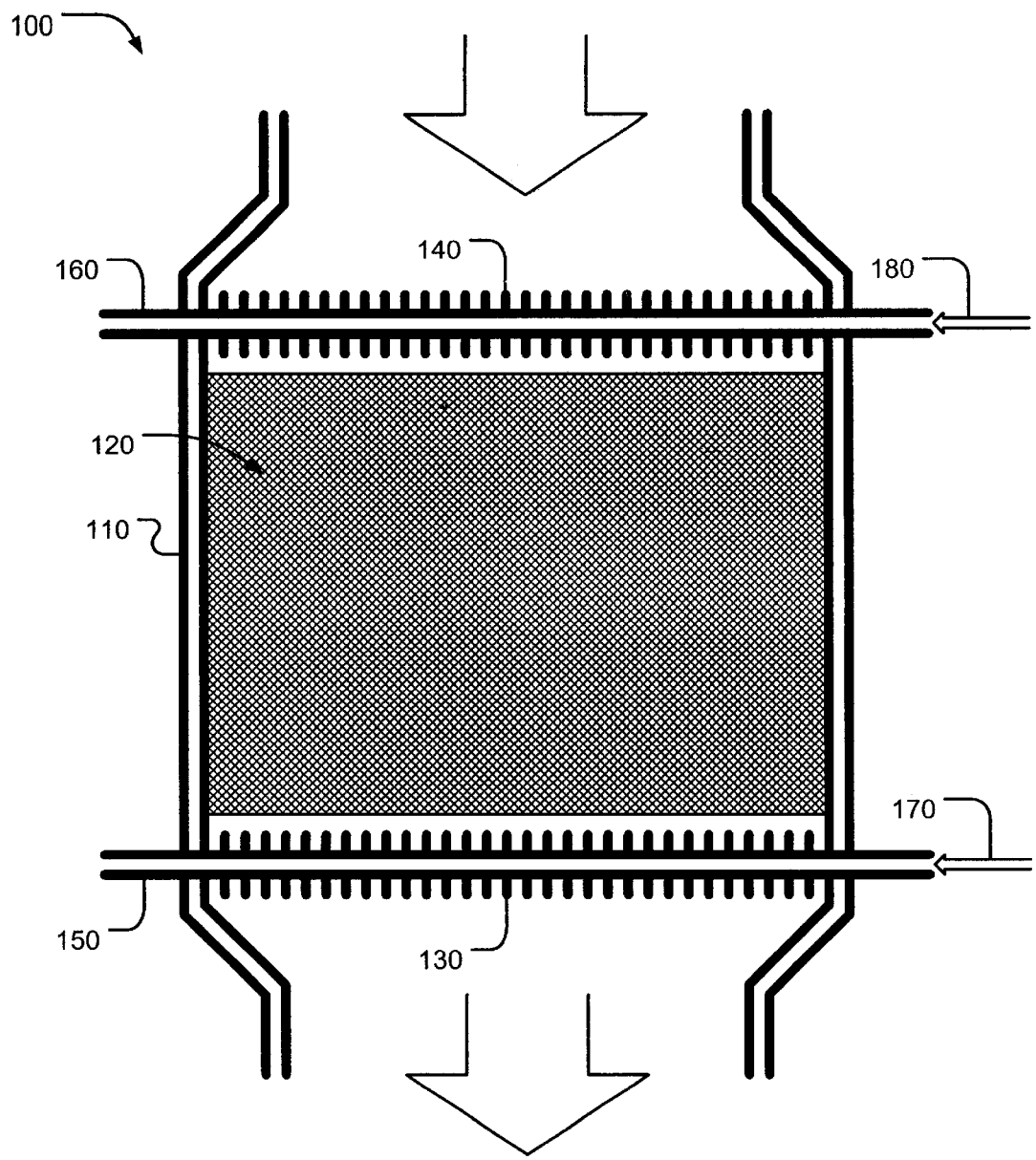
FIG. 1 is a diagram showing a lateral cross-section of a conventional thermoacoustic driver having a hot heat exchanger and a primary cold heat exchanger, which are used to generate a temperature gradient across a regenerator, which in turn amplifies an acoustic traveling wave.

Reference is now made in detail to the description of several embodiments as illustrated in the drawings. While the several embodiments are described in connection with these drawings, there is no intent to limit the invention to the embodiments disclosed herein. On the contrary, the intent is to cover all alternatives, modifications and/or equivalents.

The embodiments described with reference to FIGS. 4 through 8 ameliorate several of the problems associated with the TASHE 200 or other known thermoacoustic devices. Unlike the conventional thermoacoustic driver 100 or the TASHE 200, which seek to eliminate any mean flow, the embodiments of FIGS. 4 through 8 introduce a mean flow across the regenerator. This mean flow is superimposed on the acoustic motions of the fluid and, for small mean flow velocities relative to the acoustic velocities, the mean flow and the acoustic motions can be considered to act independently of one another. The use of an applied mean flow facilitates the addition of an internal combustion process in the device, as the mean flow can supply the combustion process with fresh reactants and carry away combustion products. Adding inlet and exhaust ports to bring in combustion reactants and carry away combustion products signifies an important shift from a traditional closed cycle thermoacoustic engine such as the TASHE 200, to an open cycle engine configuration. Thermodynamically, an open cycle thermoacoustic engine can be more efficient than a closed cycle thermoacoustic engine in converting fuel energy to acoustic energy, as the inefficiencies involved in transferring heat into a closed cycle engine are not present in an open cycle configuration.

Thus, as a result of the mean flow, the hot heat exchanger 130 may be replaced by a mean flow of hot gas, where the heat in the hot gas is obtained from a combustion zone inside the device. The absence of the hot heat exchanger 130 can drastically reduce thermal stresses that are present in the TASHE 200 and other thermoacoustic engines, particularly if the heat exchanger being replaced is a cross-flow hot heat exchanger. Additionally, by concentrically disposing a thermoacoustic driver within an outer shell, the thickness of the walls of the thermoacoustic driver may be significantly reduced. Consequently, axial heat conduction losses through these walls may be reduced as a result of the reduced wall thickness. Furthermore, radial heat transfer from the thermoacoustic driver may be used to further increase the efficiency of the thermoacoustic device.

Figure 2:
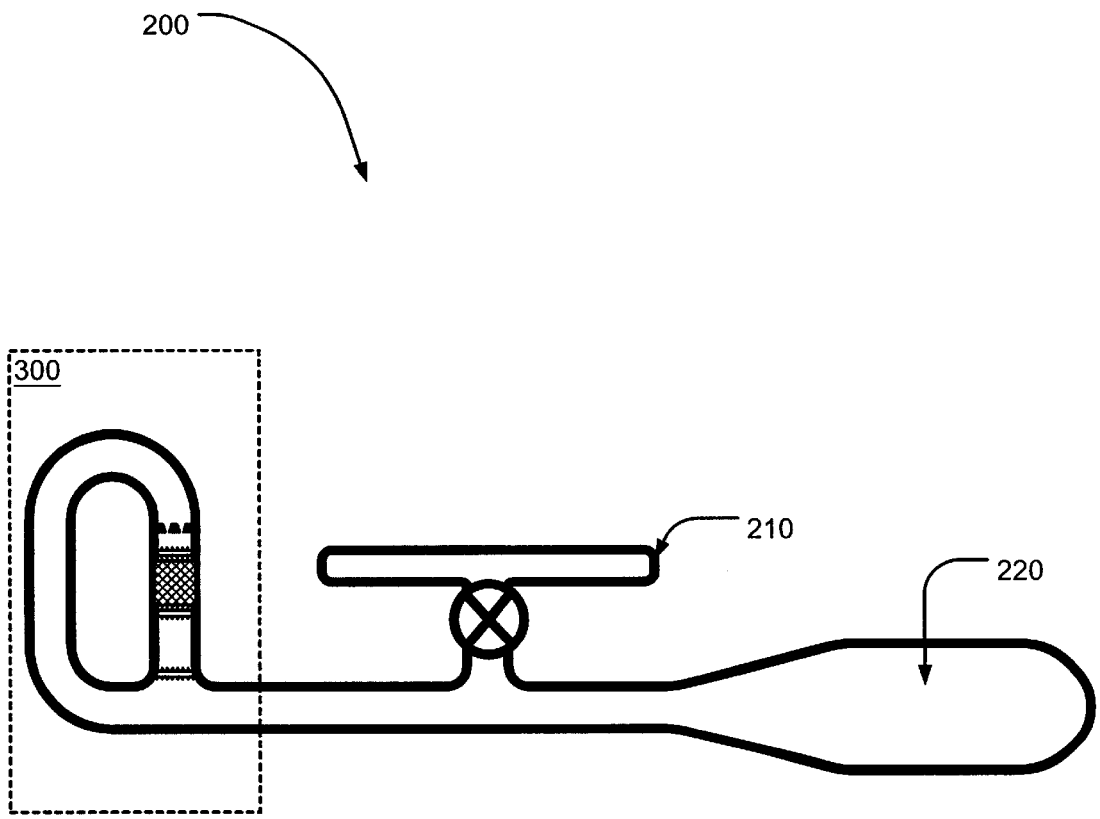
FIG. 2 is a diagram showing a cross-sectional view of a thermoacoustic Stirling heat engine (TASHE) having a conventional thermoacoustic driver.
Figure 3:
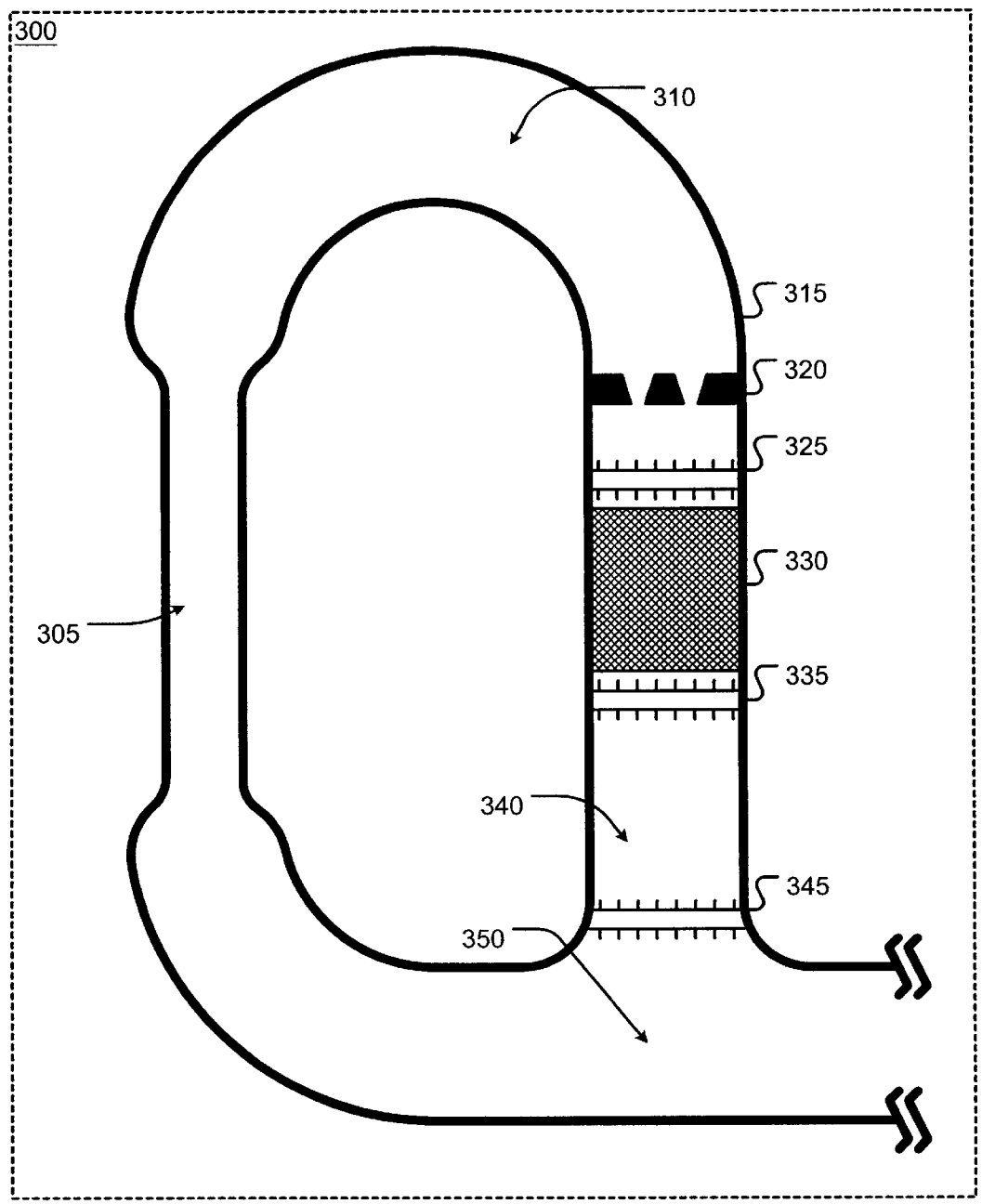
FIG. 3 is a diagram showing, in greater detail, the thermoacoustic driving section of the TASHE engine from FIG. 2.
Figure 4:
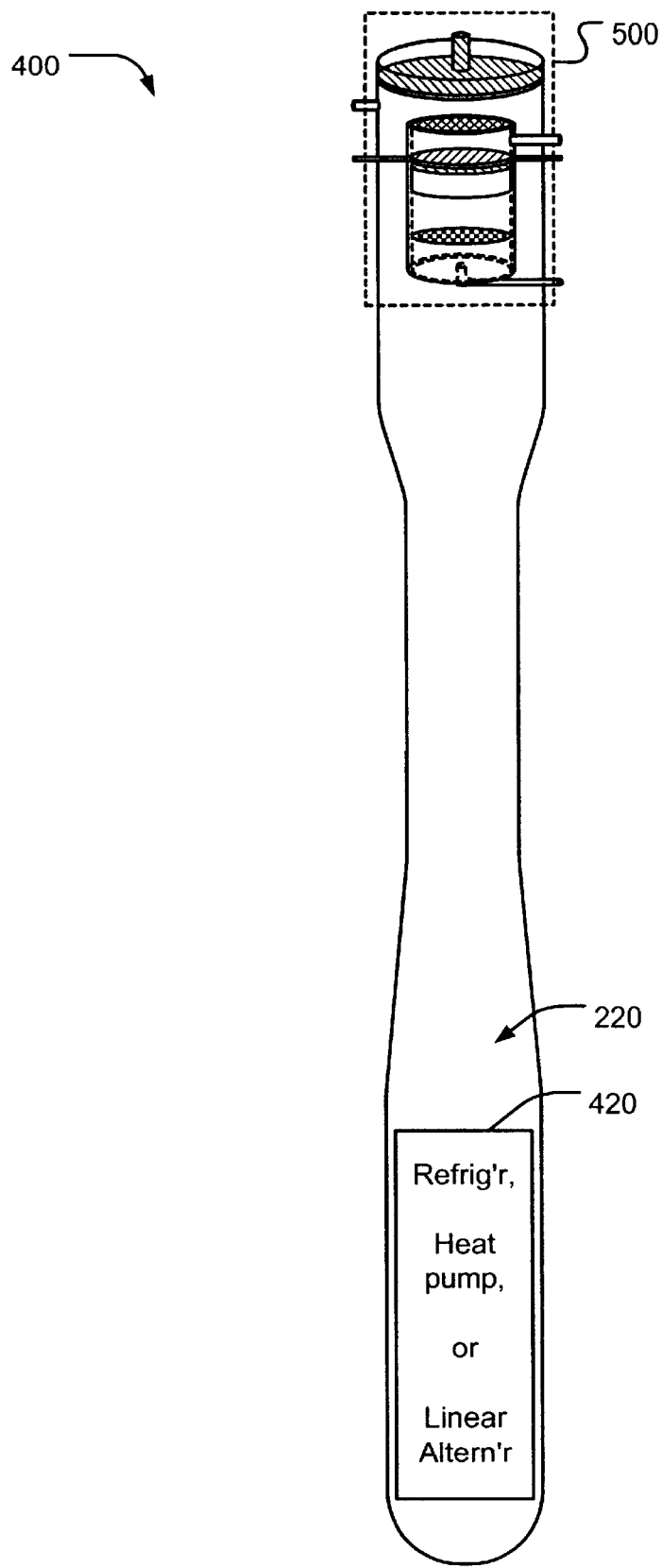
FIG. 4 is a diagram of an embodiment of a thermoacoustic device having a thermoacoustic driver and a thermoacoustic refrigerator, a thermoacoustic heat pump, or a linear alternator.

Referring back to the drawings, FIG. 4 is a diagram showing an embodiment of a thermoacoustic device 400. As shown in FIG. 4, the thermoacoustic device 400 comprises a resonator 220, a thermoacoustic driving section 500, and a thermoacoustic refrigerator, thermoacoustic heat pump, or linear alternator 420. The thermoacoustic device 400 is filled with compressible fluid. In an example embodiment, the thermoacoustic device 400 is filled with air and combustion products that are pressurized to increase the acoustic power density of the thermoacoustic device 400. The increased acoustic power density reduces the impact of thermal conduction losses within the thermoacoustic device 400. Unlike the conventional thermoacoustic driver 100 of FIG. 1 or the TASHE 200 of FIGS. 2 and 3, the thermoacoustic device 400 of FIG. 4 manipulates acoustic energy by supplying heat to a regenerator with a mean flow of hot combustion products. Greater details of a thermoacoustic driving section 500 of FIG. 4 are shown with reference to FIG. 5.

In some embodiments, acoustic energy generated by the thermoacoustic driving section 500 is directed through the resonator 220 to a thermoacoustic refrigerator 420, where the acoustic energy is used for refrigeration. In some embodiments of this type, the thermoacoustic device 400 may be used to liquefy natural gas for ease of transport. A portion of the natural gas is burned to generate heat in the combustion zone of the thermoacoustic driving section 500, and the acoustic energy that is generated in the thermoacoustic driving section 500 is used in a staged thermoacoustic refrigeration process 420 to liquefy the remainder of the natural gas. In other embodiments of this type, the thermoacoustic refrigerator 420 can be used to provide air conditioning or residential refrigeration without the use of chlorofluoro-carbons (CFCs) or other environmentally toxic refrigerants.

In other embodiments, the acoustic energy generated by the thermoacoustic driving section 500 is directed to a thermoacoustic heat pump 420. In embodiments of this type, the acoustic energy can be used to provide space heating or residential water heating. In still other embodiments, the acoustic energy generated by the thermoacoustic driving section 500 is directed to a linear alternator 420, which converts the acoustic energy into electrical energy. Since the thermoacoustic device 400 contains few, if any, moving parts, an embodiment of this type may be ideal for use as a remote or portable gas-powered electric generator, where low maintenance and high reliability are desirable features.

In addition to converting acoustic energy into other forms of energy, the thermoacoustic device 400 may be used simply to amplify or generate acoustic waves at a given frequency. One application of such an acoustic-wave amplifier would be in the lumber industry, where the acoustic vibrations may assist in drying lumber in a kiln. These and other applications should be understood by those of skill in the art.

Figure 5:
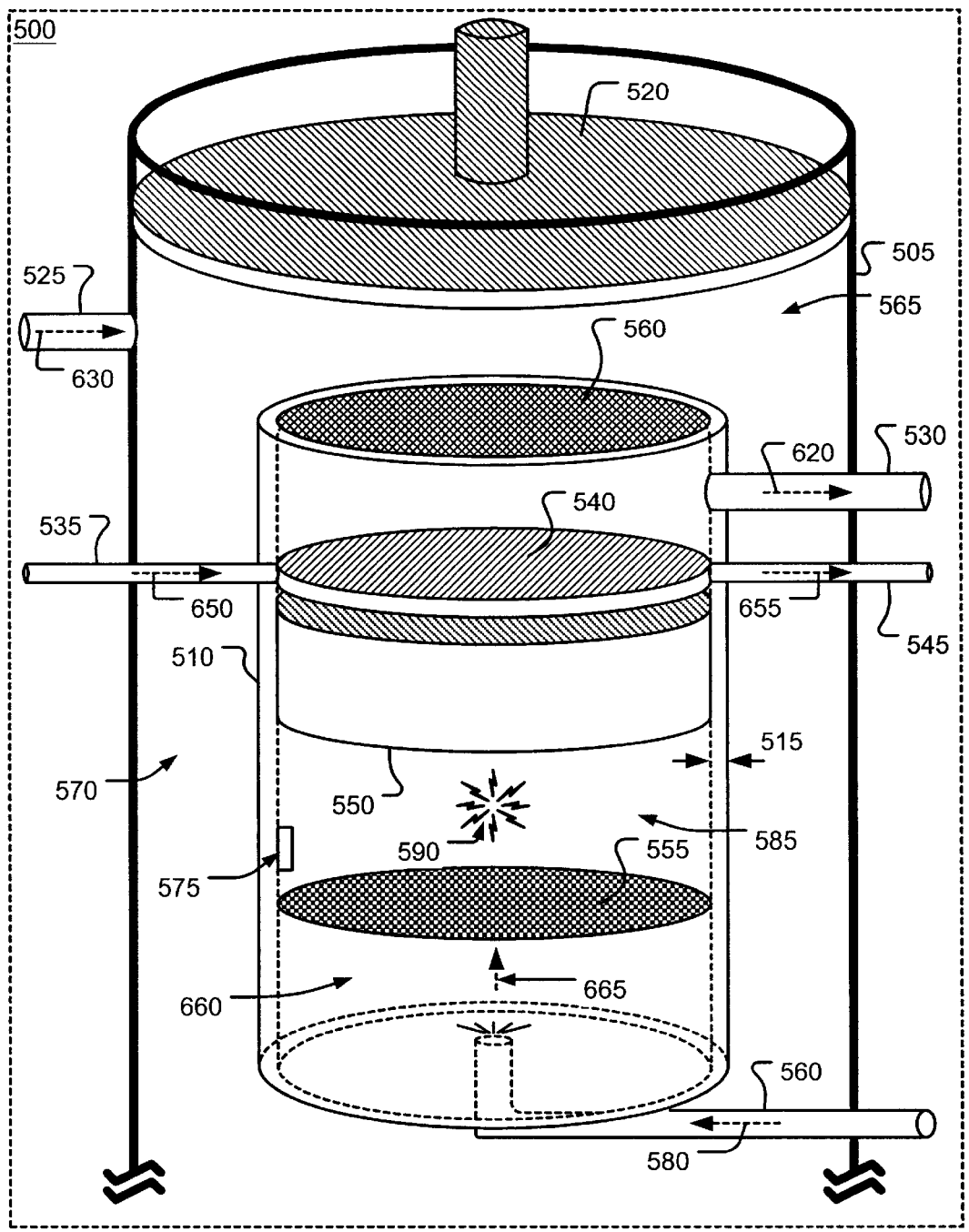
FIG. 5 is a diagram showing, in greater detail, the thermoacoustic driving section from FIG. 4.

As shown in FIG. 5, the thermoacoustic driving section 500 comprises a shell 505 and a thermoacoustic driver 510. In an example embodiment, the shell 505 is substantially cylindrical in shape and the thermoacoustic driver 510 is located concentrically within the shell 505. By locating the thermoacoustic driver 510 within the shell 505, the burden of containing the high pressures inside the device is shifted from the thermoacoustic driver 510 to the shell 505. Thus, the thickness of the walls 515 of the thermoacoustic driver 510 may be significantly reduced as compared to the TASHE 200. Consequently, axial conduction losses may be greatly reduced due to the reduced wall thickness.

The shell 505 includes an inlet port 525 that introduces a compressible inlet fluid 630 to the interior of the shell 505. In an example embodiment, the compressible inlet fluid 630 includes an oxidizer, such as air, which later mixes with fuel to create a combustible mixture that burns to generate heat. In other embodiments, the compressible inlet fluid 630 admitted through the inlet port 525 may include a combustible mixture so that further fuel injection and mixing is unnecessary. Furthermore, the inlet port 525 may be configured to suppress the escape of acoustic energy from the thermoacoustic device. In one such embodiment, the length of the inlet port 525 may be adjusted so that acoustic energy is reflected back to the interior of the shell 505. In another such embodiment, the inlet port 525 can be highly pressurized, and the compressible inlet fluid 630 is admitted to the shell 505 through a choked nozzle, which will not allow acoustic waves to propagate upstream into the inlet port 525 and out of the device.

The shell 505 further comprises a compliance section 565 and an inertance section 570, which permit the feedback of acoustic energy from the hot end of the thermoacoustic driver to the cold end, and which define properties related to the acoustic traveling wave as it propagates through the device. The thermoacoustic driving section 500 has a movable end-cap 520, which is positioned at one end of the shell 505. The movable end-cap 520 permits tuning of the volume of the compliance section 565 of the shell 505, thereby permitting adjustment of the resonant properties related to the acoustic traveling wave. In addition to providing a tunable compliance, the end-cap 520 permits easy access to the thermoacoustic driver 510 in the event that maintenance is required on the thermoacoustic driver 510. The compliance section 565, the inertance section 570, and the regenerator 550 are geometrically configured to set up a traveling wave acoustic phasing at the regenerator 550, thereby constructively providing the feedback acoustic energy for amplification at the regenerator 550. Additionally, the compliance section 565, the inertance section 570, and the regenerator 550 are geometrically configured to establish a region of relatively low acoustic velocity across the regenerator 550, thereby decreasing viscous losses within the regenerator 550.

The thermoacoustic driver 510 includes a primary cold heat exchanger 540 having a coolant inlet 535 and a coolant outlet 545. The coolant inlet 535 introduces incoming coolant 650 to the primary cold heat exchanger 540, while the coolant outlet 545 expels the outgoing coolant 655 from the primary cold heat exchanger 540. In some embodiments, the coolant 650, 655 may be cold water used to cool the primary cold heat exchanger 540.

The thermoacoustic driver 510 also includes a regenerator 550 and a combustion zone 585. In one such embodiment, the regenerator 550 has a cold side, which is coupled to the primary cold heat exchanger 540, and a hot side, which is coupled to the combustion zone 585. The coupling of the primary cold heat exchanger 540 and the combustion zone 585 to the regenerator 550 establishes a temperature gradient across the regenerator 550. The regenerator 550 comprises packing material that is fine enough so that combustion products 620 in the regenerator 550 are essentially in thermal equilibrium with the packing around it, but not so fine as to prevent the passage of acoustic waves through the regenerator 550. The temperature gradient across the regenerator 550 amplifies acoustic traveling waves as the combustion products 620 expand and contract within the regenerator 550 due to the pressure oscillations of the acoustic traveling wave. The combustion zone 585 is configured to burn a combustible mixture 665, which generates heat and the combustion products 620 that are conveyed to the hot side of the regenerator 550 by the mean flow. Due to the close thermal contact between the gas and the solid within the regenerator 550, the mean flow of combustion products 620 from the hot side of the regenerator 550 to the cold side of the regenerator 550 causes the combustion products 620 to be cooled and to exit the cold side of the regenerator 550 at approximately the same temperature as the cold side of the regenerator 550. In some embodiments, radiative heat transfer from the combustion zone 585 to the regenerator 550 may be used to augment the transfer of heat by convective means.

In some embodiments, the combustion zone 585 may be a combustion chamber adapted to contain the burning of the combustible mixture 665. In this regard, the device may include a fuel injector 560 that delivers fuel 580 to a mixing section 660, in which the fuel 580 mixes with the oxidizer in the compressible inlet fluid 630 to create a combustible mixture 665. The combustible mixture 665 is directed to the combustion zone 585 from the mixing section 660 by the mean flow.

The combustion zone 585 may also comprise an igniter 590 that initially ignites the combustible mixture 665 within the combustion zone 585, and a flame holder 555 that is adapted to hold a flame for subsequent burning of the combustible mixture 665 after the first ignition. In some embodiments, the flame holder 555 is comprised of a wire, a wire mesh screen, or any other stationary object that can be used to anchor a flame. The flame holder 555 may also be coated with a catalyst that acts as an ignition source. In other embodiments, the igniter 590 itself may act as the flame holder 555. In other embodiments, the fuel injector 560 may be used as the flame holder 555, in which case the mixing section 660 is contained within the combustion zone 585.

In other embodiments, the combustion zone 585 may include a catalyst to aid in the combustion of the combustible mixture 665. In this regard, the combustion zone 585 may be a matrix having its surface coated with a combustion catalyst. In an example embodiment, the matrix is configured to have sufficient surface area to permit interaction of the combustible mixture 665 with the catalyst, thereby facilitating combustion of the combustible mixture 665. Since processes related to catalytic combustion are known to those of skill in the art, further discussion of catalytic combustion is omitted here. It should, however, be appreciated that such a process may further simplify the thermoacoustic driver 510, as the use of a catalyst in the combustion zone 585 would eliminate the need for the igniter 590 and the flame holder 555.

In other embodiments, the burning of the combustible mixture 665 is synchronized with the pressure oscillations of the acoustic traveling wave. The synchronized combustion amplifies the pressure oscillations, thereby adding to the acoustic power output of the thermoacoustic driving section 500. For embodiments that synchronize the combustion to the pressure oscillations, the combustion zone 585 may include a sensor 575, which is configured to detect the pressure oscillations and convey this information to a controller (not shown) that controls the synchronized combustion. The synchronized combustion may be controlled by providing the fuel 580 at predefined time intervals that are substantially synchronous to the pressure oscillations detected by the sensor 575. The timing of the fuel delivery may be altered to provide optimum phasing between the pulse combustion and the acoustic oscillations. In other embodiments, the controller provides timed ignition control of the igniter 590, such that the combustible mixture 665 periodically ignites and burns in phase with the pressure oscillations.

In other embodiments, the pressure oscillations may be synchronized to the pulse combustion using a passive approach. In one such approach, the fuel 580 may be delivered to the mixing section 660 through a pressurized pipe 560, capped with a nozzle. The rate at which the fuel 580 flows through the nozzle is approximately proportional to the square root of the pressure difference across the nozzle. Hence, during the peaks in the pressure oscillations, the pressure difference across the fuel nozzle is small and the fuel flow rate out of the nozzle is small. During troughs in the pressure oscillations, the pressure difference across the fuel nozzle is large, resulting in a higher fuel flow rate out of the nozzle. In this manner, fuel flow rate oscillations cause fluctuations in the ratio of fuel to oxidizer in the combustible mixture 665, which can lead to combustion oscillations in the combustion zone 585. The phase of the pulse combustion relative to the phase of the pressure oscillations may be adjusted by altering the distance between the flame holder 555 and the fuel injector 560.

The thermoacoustic driver 510 also comprises an acoustically transparent barrier 560 that is relatively impermeable to the mean flow in the device. Additionally, the thermoacoustic driver 510 has an exhaust port 530 that expels the mean flow of combustion products 620 after the combustion products 620 have been directed through the regenerator 550 and the primary cold heat exchanger 540. The acoustically transparent barrier 560 sustains a mean pressure difference across the acoustically transparent barrier 560, thereby directing the mean flow in the device from the inlet port 525, through the combustion zone 585 and the regenerator 550, and out the exhaust port 530. In the absence of the acoustically transparent barrier 560, the regenerator 550 presents a large resistance to the mean flow in the device. Thus, the path of least resistance for the mean flow of compressible inlet fluid 630 is directly from the inlet port 525 to the exhaust port 530, effectively bypassing the combustion zone 585 and the regenerator 550. The acoustically transparent barrier 560 also attempts to prevent the re-introduction of the mean flow from the thermoacoustic driver 510 into the shell 505, separating the combustion products 620 from the compressible inlet fluid 630 that is introduced at the inlet port 525. Furthermore, the acoustically transparent barrier 560 must allow the passage of the feedback acoustic energy from the inertance 570 and compliance 565 to the regenerator 550 with minimal attenuation of acoustic energy. Thus, in some embodiments, the acoustically transparent barrier 560 may be a vibrating membrane that is impermeable to the mean flow in the device. In other embodiments, the acoustically transparent barrier 560 may be a hydrodynamic jet pump that may be similar to that used in the TASHE 200, a piston, etc. Additionally, the exhaust port 530, in an example embodiment, is configured to suppress the escape of acoustic energy from the thermoacoustic device. In this regard, the length of the exhaust port 530 may be adjusted so that acoustic energy is reflected back to the interior of the thermoacoustic driver 510.

As seen from FIG. 5, the combustion zone 585 in FIG. 5 replaces the hot heat exchanger 335 of FIG. 3, thereby eliminating any thermal stresses accompanying the hot heat exchanger 335. Additionally, the proximity of the thermoacoustic driver to the mean flow path permits radial heat transfer from the regenerator 550 to the surrounding compressible inlet fluid 630 in the inertance 570. Similarly, the proximity of the combustion zone 585 to the mean flow path permits radial heat transfer from the combustion zone 585 to the surrounding compressible inlet fluid 630. The radial heat transfer preheats the surrounding compressible inlet fluid 630. In embodiments where the compressible inlet fluid comprises the combustible mixture, the combustible mixture becomes preheated and enters the combustion zone 585. In embodiments where the compressible inlet fluid 630 comprises an oxidizer, the oxidizer is preheated and enters the mixing section 660, where it mixes with the fuel 580, thereby creating a preheated combustible mixture 665 that enters the combustion zone 585. This radial heat transfer, normally a loss in a conventional thermoacoustic driver 100 or a device like the TASHE 200, is instead recycled by effectively preheating the combustible mixture 665 before it enters the combustion zone 585. While excessive preheating could lead to premature ignition of the combustible mixture 665 before it enters the combustion zone 585, reasonable levels of preheating may be used to either increase the combustion temperature within the combustion zone 585, or to reduce the consumption of fuel 580 required to reach a desired combustion temperature, either of which increases the efficiency of the device.

Figure 6:
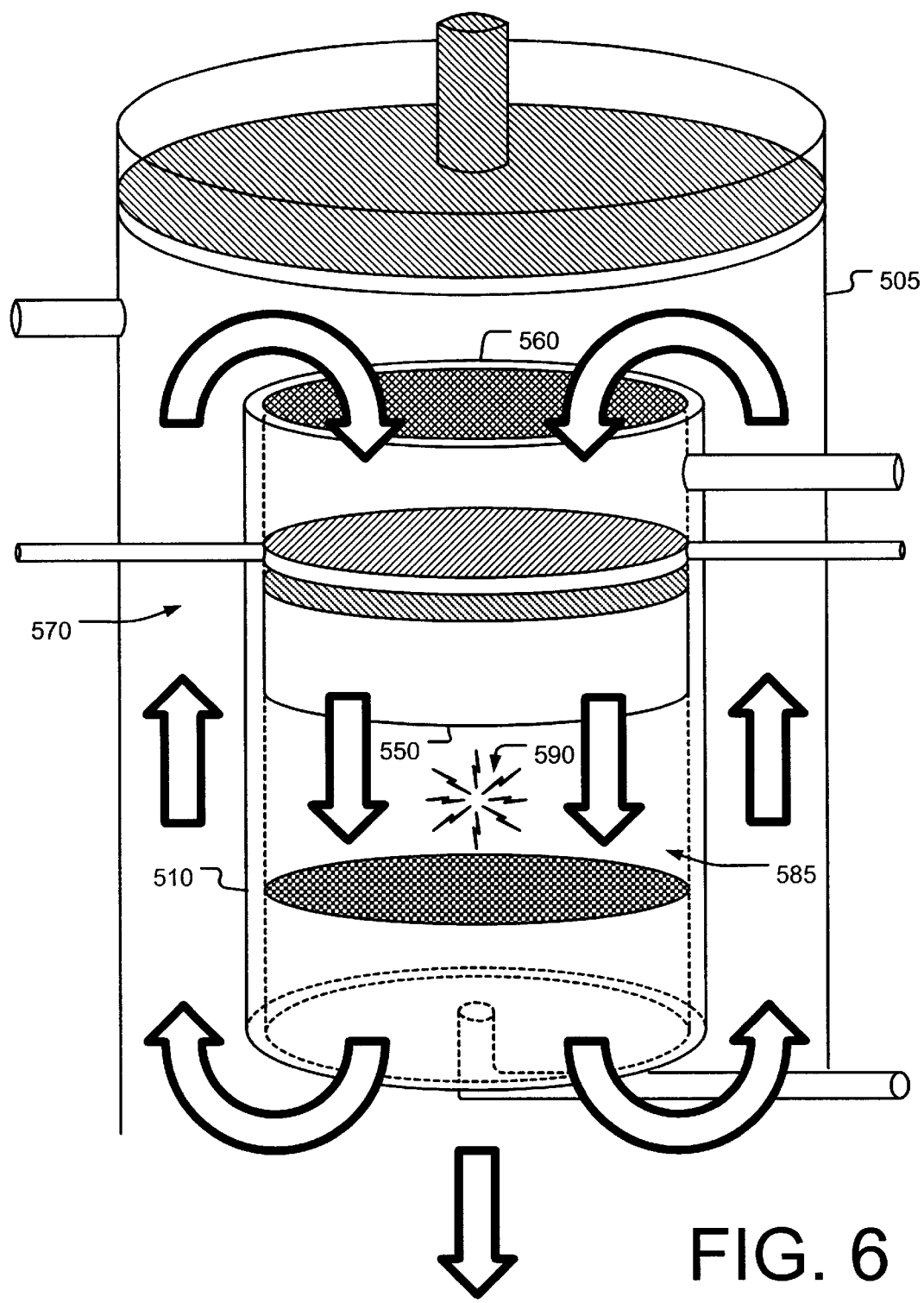
FIG. 6 is a diagram showing the acoustic energy flow paths in the thermoacoustic driver of FIG. 5.

FIG. 6 is a diagram showing acoustic energy flow in the thermoacoustic driver section 500 of FIG. 5. In the embodiment of FIG. 6, acoustic energy is directed through the feedback inertance 570 established by concentrically disposing the thermoacoustic driver 510 within the shell 505. As shown in FIG. 6, acoustic energy passes through the acoustically transparent barrier 560 with little attenuation, and is directed down through the regenerator 550, where it is amplified by the temperature gradient across the regenerator 550. Then the acoustic energy passes through the combustion zone 585, where it may be further amplified by a pulse combustion process. As the acoustic energy exits the thermoacoustic driver 510, a portion of the acoustic energy is directed to the resonator 220 for use by a thermoacoustic refrigerator, thermoacoustic heat pump or linear alternator 420, while the remaining portion of the acoustic energy is directed back to the regenerator 550 through the feedback inertance 570, thus sustaining the process.

Figure 7:
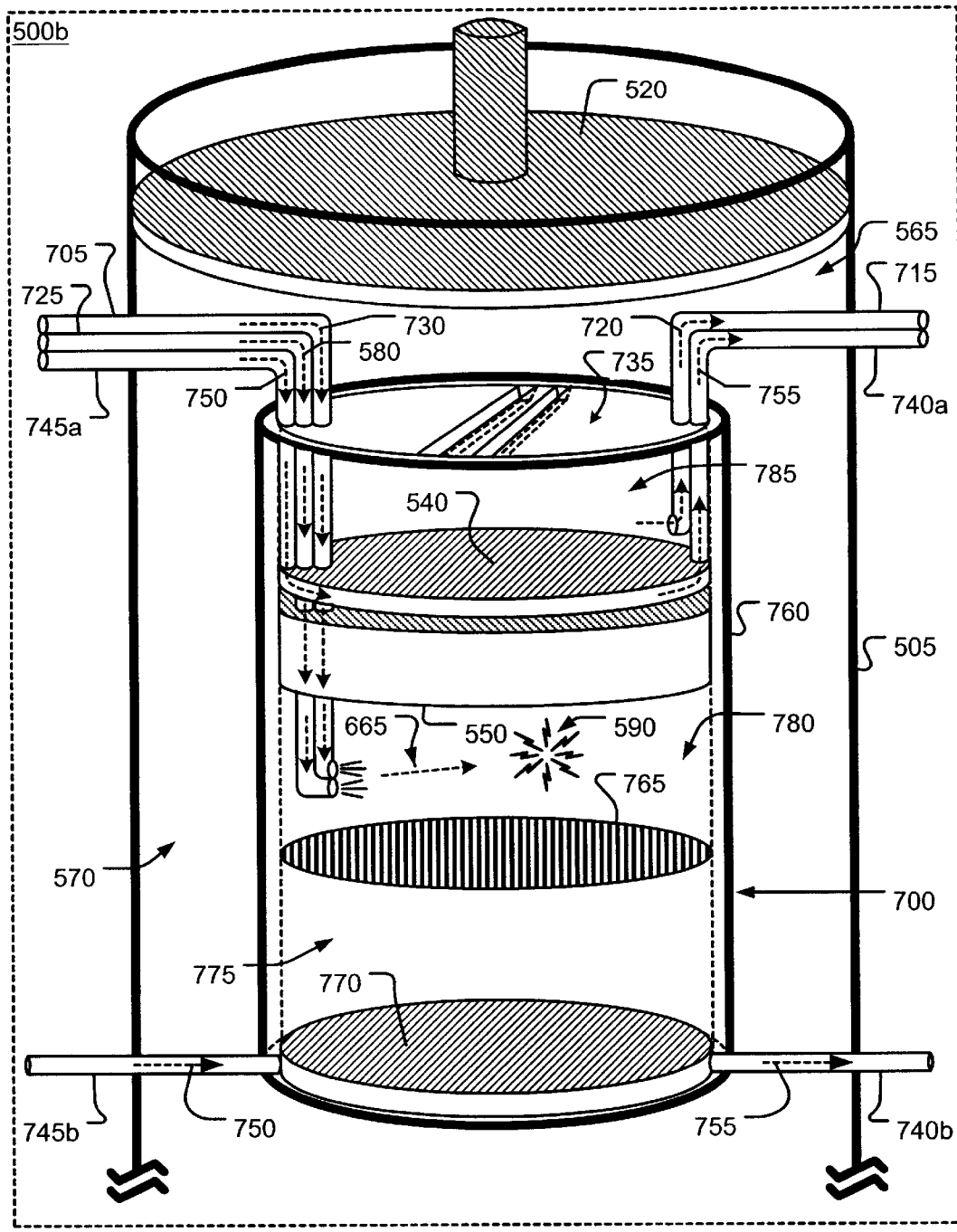
FIG. 7 is a diagram showing an embodiment of a thermoacoustic driver with a feedback path that is thermally insulated from a combustion process within the thermoacoustic driver.

FIG. 7 is a diagram showing another embodiment of the thermoacoustic driving section 500b. The embodiment of FIG. 7 provides several modifications from the embodiment as shown in FIG. 5. In this regard, the thermoacoustic driving section 500b of FIG. 7 comprises a shell 505, an inlet conduit 705, a fuel inlet 725, coolant inlet 745a, a coolant outlet 740a, an exhaust port 715, and a thermoacoustic driver 700 that is concentrically positioned within the shell 505. The inlet conduit 705 and the fuel inlet 725 are adapted to admit a compressible inlet fluid 730 and fuel 580, respectively, into the thermoacoustic driver 700, while the exhaust port 715 is adapted to expel cold combustion products 720 that have been directed through various components in the thermoacoustic driver 700. The coolant inlet 745a is adapted to introduce incoming coolant 750 to the thermoacoustic driver 700, and the coolant outlet 740a expels the outgoing coolant 755 after the coolant has passed through the thermoacoustic driver 700. In one embodiment, the coolant 750, 755 may be cold water.

The shell 505 comprises a compliance section 565 and an inertance section 570, which together permit the feedback of acoustic energy (e.g., an acoustic traveling wave) from one end of the thermoacoustic driver 700 to the other end of the thermoacoustic driver 700. Additionally, these sections 565, 570 define properties related to the acoustic traveling wave as it propagates through the device. The thermoacoustic driving section 500b has a movable end-cap 520, which is positioned at one end of the shell 505. Since the compliance section 565, inertance section 570, and movable end-cap 520 are discussed above with reference to FIG. 5, further discussion of these components is omitted here.

The thermoacoustic driver 700 comprises an insulated wall 760 that thermally insulates the thermoacoustic driver 700 from the remaining portion of the interior of the shell 505. Thus, regardless of temperature changes within the thermoacoustic driver 700, the temperature of the remaining portion of the interior of the shell 505 remains relatively constant. This is particularly important in the inertance 570, where temperature variations would lead to variations in the density of the compressible fluid within the inertance 570, which may alter the properties of the acoustic traveling wave passing through the inertance 570.

As shown in FIG. 7, the interior of the thermoacoustic driver 700 comprises a primary cold heat exchanger 540, a regenerator 550, a combustion zone 780, a flow straightener 765, and a thermal buffer tube 775. The primary cold heat exchanger 540 is coupled to the coolant inlet 745a and the coolant outlet 740a. The coolant inlet 745a introduces incoming coolant 750 to the primary cold heat exchanger 540, while the coolant outlet 740a expels the outgoing coolant 755 from the primary cold heat exchanger 540.

In one embodiment, the regenerator 550 has a cold side, which is coupled to the primary cold heat exchanger 540, and a hot side, which is coupled to the combustion zone 780. As described above with reference to FIG. 5, the coupling of the primary cold heat exchanger 540 and the combustion zone 780 to the regenerator 550 establishes a temperature gradient across the regenerator 550. The temperature gradient across the regenerator 550 amplifies acoustic traveling waves as the combustion products expand and contract within the regenerator 550 due to the pressure oscillations of the acoustic traveling wave. Since the amplification of acoustic traveling waves is described in detail with reference to FIG. 5, further discussion of the operation of the regenerator 550 is omitted here.

The combustion zone 780 is configured to burn a combustible mixture 665, which generates heat and the combustion products 720 that are conveyed to the hot side of the regenerator 550 by the mean flow. Due to the close thermal contact between the gas and the solid within the regenerator 550, the mean flow of combustion products 720 from the hot side of the regenerator 550 to the cold side of the regenerator 550 causes the combustion products 720 to be cooled and to exit the cold side of the regenerator 550 at approximately the same temperature as the cold side of the regenerator 550. In the embodiment of FIG. 7, the combustion zone 780 is coupled to the inlet conduit 705 and the fuel inlet 725. In this regard, if the compressible inlet fluid 730 contains an oxidizer, then the mixing of the compressible inlet fluid 730 and the fuel 580 at the combustion zone 780 results in a combustible mixture 665. To increase the efficiency of the device, the inlet conduit 705 and the fuel inlet 725 may be configured to suppress the escape of acoustic energy from the thermoacoustic device. In one embodiment, the lengths of these inlet ports 705, 725 may be adjusted so that acoustic energy is reflected back to the interior of the thermoacoustic driver 700. In another embodiment, the inlet ports 705, 725 can be highly pressurized, with the compressible inlet fluid 730 and the fuel 580 being admitted to the combustion zone 780 through choked nozzles, which will not allow acoustic perturbations to propagate upstream into these inlet ports 705, 725 and out of the device. While separate inlet ports 705, 725 are shown for the compressible inlet fluid 730 and the fuel 580, it should be appreciated that, similar to FIG. 5, the compressible inlet fluid .730 and the fuel 580 may be supplied to the combustion zone 780 through a single inlet conduit in the form of a compressible combustible mixture 665. Additionally, it should be appreciated that, similar to FIG. 5, the burning of the combustible mixture may be pulsed in phase with the acoustic traveling wave such that the pulsed combustion constructively adds to the energy of the acoustic traveling wave. Since the combustion zone 780 of FIG. 7 serves a similar function to the combustion zone 585 of FIG. 5, further discussion of the combustion zone 780 and the use of pulse combustion is omitted here.

The thermal buffer tube 775 is used to help thermally isolate the combustion zone 780 from the remaining portion of the interior of the shell 505. The compressible fluid within the thermal buffer tube 775 sustains a mean temperature gradient from its hot side, which is coupled to the combustion zone 780, to its cold side, which is coupled to a secondary cold heat exchanger 770. To effectively sustain such a temperature gradient, care should be taken such that minimal net convective heat transfer effects are present in the thermal buffer tube 775. In this manner, the compressible fluid in the thermal buffer tube 775 will remain thermally stratified along its length, and the primary method of heat transfer down the thermal buffer tube 775 is either through thermal conduction in the compressible fluid, or through axial thermal conduction in the portion of the insulated wall 760 that surrounds the thermal buffer tube 775, depending on the thickness and axial thermal conductivity of this wall. For efficient operation, the thermal buffer tube 775 should preferably be at least twice as long as an acoustic displacement length, and may be tapered to reduce the effects of Rayleigh streaming in the thermal buffer tube 775. Since Rayleigh streaming is known in the art and discussed in greater detail in U.S. Pat. No. 5,953,920 to Swift et al., further discussion of Rayleigh streaming is omitted here.

In some embodiments of the device, a flow straightener 765 is located between the combustion zone 780 and the thermal buffer tube 775 to preserve thermal stratification in the thermal buffer tube 775. Since, in some embodiments, the combustion zone 780 contains a pulsed combustion process, a fairly turbulent environment may exist within the combustion zone 780 due to the pulsed combustion, which in turn may introduce undesired turbulence into the thermal buffer tube 775. The flow straightener 765 reduces the encroachment of turbulence from the combustion zone 780 to the thermal buffer tube 775. The flow straightener 765 may also serve a secondary role as a flashback arrestor. Through the axial acoustic motions that occur across the flow straightener 765 between the combustion zone 780 and the thermal buffer tube 775, it is possible that the thermal buffer tube 775 may contain a quantity of unburned combustible mixture 665. Through thermal and chemical interactions with the walls of the flow straightener 765, the flames that burn the combustible mixture 665 in the combustion zone 780 should not be able to propagate beyond the flow straightener 765. Thus, the combustible mixture 665 in the thermal buffer tube 775 should not explosively ignite and burn, thereby avoiding a potentially hazardous situation.

In conjunction with the primary cold heat exchanger 540 and the insulated wall 760, the secondary cold heat exchanger 770 thermally insulates the thermal processes that occur within the thermoacoustic driver 700 from the remaining portion of the interior of the shell 505. The secondary cold heat exchanger 770 helps generate the temperature gradient along the length of the thermal buffer tube 775, and removes any heat that is transferred down this temperature gradient from the combustion zone 780. The secondary cold heat exchanger 770 is coupled to a coolant inlet 745b and a coolant outlet 740b. The coolant inlet 745b introduces incoming coolant 750 to the secondary cold heat exchanger 770, while the coolant outlet 740b expels the outgoing coolant 755 from the secondary cold heat exchanger 770. In some embodiments, the same coolant inlet 745a and the same coolant outlet 740a may be used for both the primary cold heat exchanger 540 and: the secondary cold heat exchanger 770. For those embodiments, the coolant inlet 745a and the coolant outlet 740a are, preferably, insulated to prevent heat transfer from the regenerator 550 or the combustion zone 780 to the coolant pipes 745a, 740a as they circulate cooling fluid to the secondary cold heat exchanger 770.

While not shown in FIG. 7, an additional flow straightener may be coupled to the secondary cold heat exchanger 770 at the end of the thermal buffer tube 775 to help preserve the thermal stratification in the thermal buffer tube 775. This flow straightener would serve to suppress non-axial flow movements that may be generated due to turbulent acoustic gas motions at the junction between the inertance 570 and the lower end of the thermoacoustic driver 700.

The thermoacoustic driver 700 also comprises an acoustically transparent barrier 735 located at one end near the exhaust port 715. The acoustically transparent barrier 735 is relatively impermeable to the mean flow of compressible fluid and sustains a mean pressure difference across the acoustically transparent barrier 735, thus forcing the mean flow in the device through the combustion zone 780 and the regenerator 550 before exiting the exhaust port 715. In some embodiments, the acoustically transparent barrier 735 may be a hydrodynamic jet pump as shown in FIG. 7. Since the acoustically transparent barrier 735 is discussed above with reference to FIG. 5, further discussion of the acoustically transparent barrier 735 is omitted here.

Unlike FIG. 5, the inlet conduit 705 of FIG. 7 passes through the regenerator 550 and admits the compressible inlet fluid 730 directly to the combustion zone 780 in the interior of the thermoacoustic driver 700. This is done to preheat the compressible inlet fluid 730 before it enters the combustion zone 780. In some embodiments, the inlet conduit 705 may be configured as an annulus that surrounds the regenerator 550 and the combustion zone 780 in order to help thermally insulate the regenerator 550 and the combustion zone 780 from the rest of the device, and to increase the amount of heat transferred to the compressible inlet fluid 730. To further augment the preheating of the compressible inlet fluid 730, other embodiments may include several inlet conduits that pass through the regenerator 550 and the combustion zone 780, or in still other embodiments, fins may be added to that portion of the interior of the inlet conduit annulus that is in thermal contact with the regenerator 550 in order to enhance the rate of radial heat transfer out of the regenerator 550. However, note that if the compressible inlet fluid 730 is comprised of a combustible mixture 665, that the amount of preheating of the combustible mixture 665 within the inlet conduit 705 should be low enough so as to avoid premature combustion within the inlet conduit 705.

Another difference shown in FIG. 7 is that, unlike the embodiment shown in FIG. 5, the insulated walls 760 and the thermal buffer tube 775 suppress heat transfer between the thermoacoustic driver 700 and the remaining interior portion of the shell 505 (e.g., the inertance section 570, the compliance section 565, etc.). The insulation between the thermoacoustic driver 700 and the remaining portion of the interior of the shell 505 reduces temperature variations in the remaining portion of the interior of the shell. Consequently, this may result in more stable properties of the acoustic traveling wave as it passes through these components.

Figure 8:
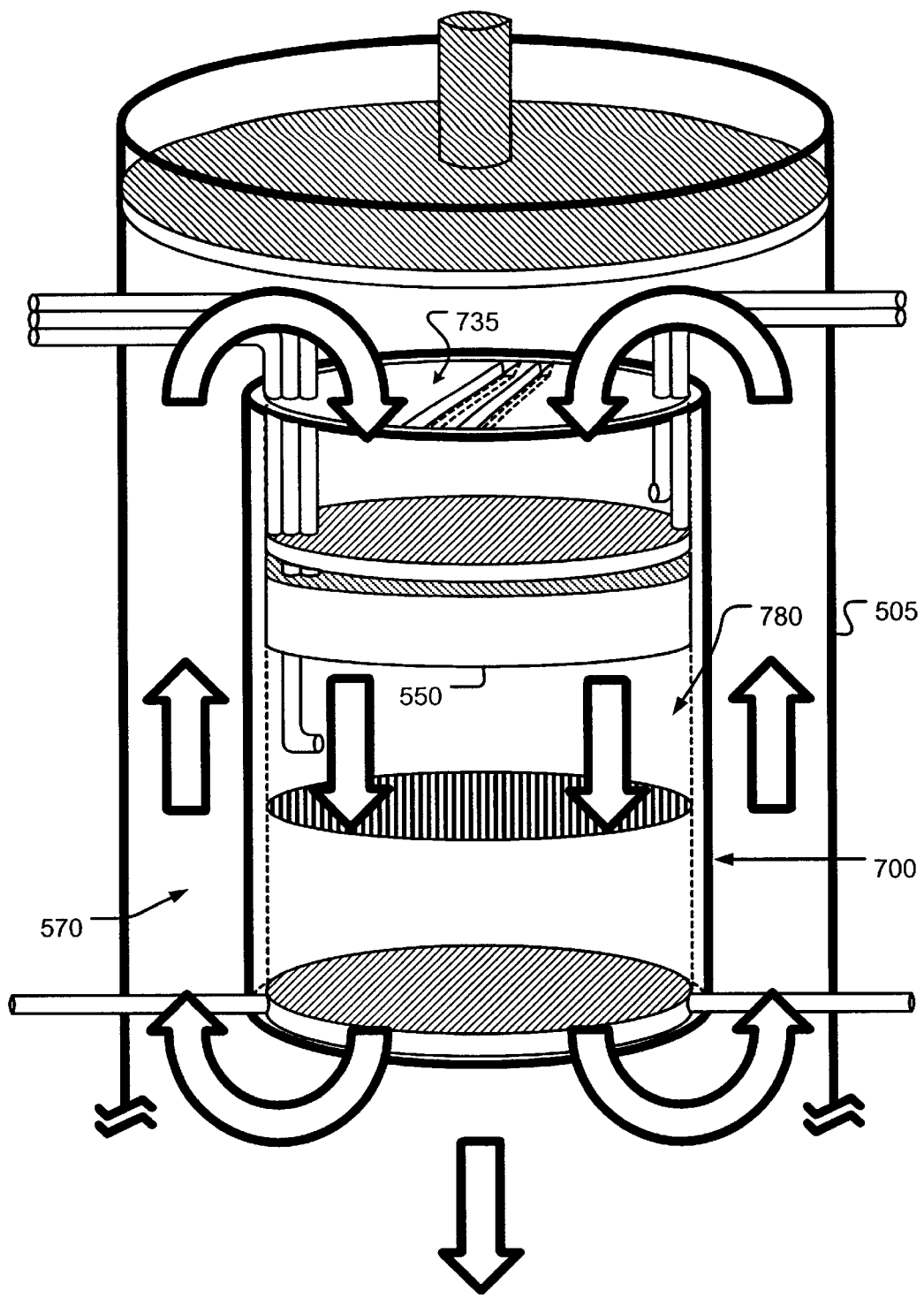
FIG. 8 is a diagram showing the acoustic energy flow paths in the thermoacoustic driver of FIG. 7

FIG. 8 is a diagram showing the acoustic energy flow paths in the thermoacoustic driving section 500b of FIG. 7. In the embodiment of FIG. 8, acoustic energy is directed through a feedback inertance section 570 established by concentrically disposing the thermoacoustic driver 700 within the shell 505. As shown in FIG. 8, acoustic energy passes through the acoustically transparent barrier 735 with minimal attenuation, and is directed down through the regenerator 550 where it is amplified by the temperature gradient across the regenerator 550. Thereafter, the acoustic energy passes through the combustion zone 780, where it may be further amplified by a pulse combustion process. As the acoustic energy exits the thermoacoustic driver 700, a portion of the acoustic energy is directed to the resonator 220 for use by a thermoacoustic refrigerator, thermoacoustic heat pump or linear alternator 420, while the remaining portion of the acoustic energy is directed back to the regenerator 550 through the feedback inertance section 570, thus sustaining the process.

As shown, the embodiments of FIGS. 4 through 8 introduce a mean flow of compressible fluid across a regenerator. As a result of the mean flow, a hot heat exchanger in a conventional thermoacoustic device may be replaced by a combustion zone, which reduces thermal stresses that were previously present with the hot heat exchanger. Also, the concentric disposition of the thermoacoustic driver within the shell allows for the reduction of the thickness of the walls of the thermoacoustic driver, thereby reducing axial heat conduction losses in the walls and further increasing efficiency.

Although exemplary embodiments have been shown and described, it will be clear to those of ordinary skill in the art that a number of changes, modifications, or alterations to the invention as described may be made. For example, it should be appreciated that the dimensions and the shape of the shell 505 and the thermoacoustic driver 700 may be varied in order to optimize the properties of the acoustic traveling wave. Additionally, while cold water 750 is used to cool the cold heat exchangers 540 and 770, it should be appreciated that various cooling fluid 750 may be used to cool the cold heat exchangers 540 and 770. It should also be appreciated that the exhaust port 715 may be located between the cold heat exchanger 540 and the regenerator 550 without adversely affecting the performance of the system. Furthermore, while example embodiments show the thermoacoustic driver 700 being substantially symmetrically disposed within the shell 505, it should be appreciated that the thermoacoustic driver 700 may be asymmetrically disposed within the shell 505. It should also be recognized that the thermoacoustic driver 700 may be located adjacent to one side of the interior of the shell 505. Alternatively, if one wished to only take advantage of the mean flow and combustion processes, a linear device without an acoustic feedback path could be used, similar to the conventional thermoacoustic driver 100 shown in FIG. 1, or a toroidal device could be used, similar to the TASHE 200 shown in FIG. 2.

All such changes, modifications, and alterations should therefore be seen as within the scope of the disclosure.

What is claimed is:

1. A thermoacoustic device comprising:
  (A) a thermoacoustic driver having:
    (A1) an inlet conduit adapted to admit a compressible inlet fluid, the compressible inlet fluid comprising an oxidizer;
    (A2) a fuel injector adapted to provide fuel;
    (A3) a mixing section adapted to receive the compressible inlet fluid from the inlet conduit, the mixing section further being adapted to receive the fuel from the fuel injector, the mixing section further being adapted to mix the fuel and the compressible inlet fluid to produce a compressible combustible mixture;
    (A4) a combustion zone configured to receive the compressible combustible mixture, the combustion zone further being configured to burn the compressible combustible mixture to generate hot compressible combustion products;
    (A5) a cold heat exchanger;
    (A6) a regenerator coupled to the combustion zone, the regenerator having a cold side and a hot side, the cold side and the hot side being configured to generate a temperature gradient across the regenerator, the cold side of the regenerator being coupled to the cold heat exchanger, the hot compressible combustion products from the combustion zone being directed to the hot side of the regenerator, the hot compressible combustion products further being directed through the regenerator to produce cold compressible combustion products, the regenerator further being configured to amplify an acoustic traveling wave propagating from the cold side of the regenerator to the hot side through the regenerator; and
    (A7) an exhaust port adapted to expel the cold compressible combustion products; and
  (B) a feedback path located external to the thermoacoustic driver, the feedback path being thermally insulated from the regenerator and the combustion zone, the feedback path being configured to direct a portion of the acoustic traveling wave from the hot side of the regenerator to the cold side of the regenerator.

2. The thermoacoustic device of claim 1, wherein the inlet conduit is an annulus surrounding the regenerator, the regenerator and the inlet conduit being in thermal contact with each other to permit heat transfer between the inlet conduit and the regenerator.

3. The thermoacoustic device of claim 1, wherein the inlet conduit is configured to pass through the regenerator, the regenerator and the inlet conduit being in thermal contact with each other to permit heat transfer between the inlet conduit and the regenerator.

4. The thermoacoustic device of claim 1, wherein the inlet conduit is an annulus surrounding the combustion zone, the combustion zone and the inlet conduit being in thermal contact with each other to permit heat transfer between the inlet conduit and the combustion zone.

5. The thermoacoustic device of claim 1, wherein the inlet conduit extends through the combustion zone, the combustion zone and the inlet conduit being in thermal contact with each other to permit heat transfer between the inlet conduit and the combustion zone.

6. The thermoacoustic device of claim 1, wherein the combustion zone is further configured employ a pulse combustion process in which the burning of the compressible combustible mixture is done in a pulsating manner, the pulsed burning of the compressible combustible mixture being synchronized to pressure oscillations of the acoustic traveling wave, the pulsed burning further being phased to the pressure oscillations of the acoustic traveling wave to amplify the pressure oscillations of the acoustic traveling wave.

7. The thermoacoustic device of claim 1, further comprising a catalyst located within the combustion zone, the catalyst being adapted to facilitate burning of the compressible combustible mixture.

8. The thermoacoustic device of claim 1, further comprising:
an acoustically transparent barrier adapted to direct the compressible combustible mixture to the combustion zone, the acoustically transparent barrier further being adapted to direct the compressible combustible products through the regenerator.

9. The thermoacoustic device of claim 1, further comprising:
a compliance section located within the feedback path; and
an inertance section located within the feedback path, the inertance section being coupled to the compliance section, the inertance section together with the compliance section being configured to define properties of the acoustic traveling wave.

10. The thermoacoustic device of claim 9, wherein the inertance section is configured as an annulus surrounding the regenerator.

11. The thermoacoustic device of claim 9, wherein the regenerator is configured as an annulus surrounding the inertance section.

12. The thermoacoustic device of claim 9, wherein the volume of the compliance section is adjustable to adjust the properties of the acoustic traveling wave.

13. The thermoacoustic device of claim 1, further comprising:
a thermal buffer tube having a cold side and a hot side, the hot side of the thermal buffer tube being coupled to the combustion zone, the cold side of the thermal buffer tube being coupled to a secondary cold heat exchanger, the thermal buffer tube being configured to thermally insulate the thermoacoustic driver from the feedback path.

14. The thermoacoustic device of claim 13, further comprising:
a flow straightener situated between the thermal buffer tube and the combustion zone, the flow straightener being adapted to prevent turbulence in the combustion zone from distributing compressible fluid in the thermal buffer tube.

15. The thermoacoustic device of claim 13, further comprising:
a flow straightener coupled to the secondary cold heat exchanger, the flow straightener being adapted to reduce turbulence at the cold side of the thermal buffer tube.

16. A thermnoacoustic device comprising:
(A) a thermoacoustic driver having:
(A1) an inlet conduit adapted to admit a compressible combustible mixture;
(A2) a combustion zone configured to receive the compressible combustible mixture, the combustion zone further being configured to burn the compressible combustible mixture to generate hot compressible combustion products;
(A3) a cold heat exchanger;
(A4) a regenerator coupled to the combustion zone, the regenerator having a cold side and a hot side, the cold side and the hot side being configured to generate a temperature gradient across the regenerator, the cold side of the regenerator being coupled to the cold heat exchanger, the hot compressible combustion products from the combustion zone being directed to the hot side of the regenerator, the hot compressible combustion products further being directed through the regenerator to produce cold compressible combustion products, the regenerator further being configured to amplify an acoustic traveling wave propagating from the cold side of the regenerator to the hot side of the regenerator; and
(A5) an exhaust port adapted to expel the cold compressible combustion products; and
(B) a feedback path located external to the thermoacoustic driver, the feedback path being thermally insulated from the regenerator and the combustion zone, the feedback path being configured to direct a portion of the acoustic traveling wave from the hot side of the regenerator to the cold side of the regenerator.

17. The thermoacoustic device of claim 16, wherein the inlet conduit is an annulus surrounding the regenerator, the regenerator being in thermal contact with the inlet conduit to permit heat transfer between the inlet conduit and the regenerator.

18. The thermoacoustic device of claim 16, wherein the inlet conduit extends through the regenerator, the regenerator being in thermal contact with the inlet conduit to permit heat transfer between the inlet conduit and the regenerator.

19. The thermoacoustic device of claim 16, wherein the inlet conduit is an annulus surrounding the combustion zone, the combustion zone being in thermal contact with the inlet conduit to permit heat transfer between the inlet conduit and the combustion zone.

20. The thermoacoustic device of claim 16, wherein the inlet conduit extends through the combustion zone, the combustion zone being in thermal contact with the inlet conduit to permit heat transfer between the inlet conduit and the combustion zone.

21. The thermoacoustic device of claim 16, wherein the combustion zone is further configured employ a pulse combustion process in which the burning of the compressible combustible mixture is done in a pulsating manner, the pulsed burning of the compressible combustible mixture being phased to the pressure oscillations of the acoustic traveling wave to amplify the pressure oscillations of the acoustic traveling wave.

22. The thermoacoustic device of claim 16, further comprising a catalyst located within the combustion zone, the catalyst being adapted to facilitate burning of the compressible combustible mixture.

23. The thermoacoustic device of claim 21, further comprising:
- a sensor adapted to detect the pressure oscillations of the acoustic traveling wave; and
- a controller adapted to regulate the burning of the compressible combustible mixture within the combustion zone in response to the detected pressure oscillations.

24. The thermoacoustic device of claim 16, further comprising:
- means for directing the hot compressible combustion products through the regenerator.

25. The thermoacoustic device of claim 16, further comprising:
- an acoustically transparent barrier adapted to direct the hot compressible combustion products through the regenerator.

26. The thermoacoustic device of claim 25, wherein the acoustically transparent barrier is a hydrodynamic jet pump.

27. The thermoacoustic device of claim 16, further comprising:
- a compliance section located within the feedback path; and
- an inertance section located within the feedback path, the inertance section being coupled to the compliance section, the inertance section together with the compliance section being configured to define properties of the acoustic traveling wave.

28. The thermoacoustic device of claim 27, wherein the inertance section is configured as an annulus surrounding the regenerator.

29. The thermoacoustic device of claim 27, wherein the regenerator is configured as an annulus surrounding the inertance section.

30. The thermoacoustic device of claim 27, wherein the volume of the compliance section is adjustable to adjust the properties of the acoustic traveling wave.

31. The thermoacoustic device of claim 16, further comprising:
- a thermal buffer tube having a cold side and a hot side, the hot side of the thermal buffer tube being coupled to the combustion zone, the cold side of the thermal buffer tube being coupled to a secondary cold heat exchanger, the thermal buffer tube being configured to thermally insulate the thermoacoustic driver from the feedback path.

32. The thermoacoustic device of claim 31, further comprising:
- a flow straightener situated between the thermal buffer tube and the combustion zone, the flow straightener being adapted to prevent turbulence in the combustion zone from disturbing compressible fluid in the thermal buffer tube.

33. The thermoacoustic device of claim 31, further comprising:
- a flow straightener coupled to the secondary cold heat exchanger, the flow straightener being adapted to reduce turbulence at the cold side of the thermal buffer tube.

* * * * *

UNITED STATES PATENT AND TRADEMARK OFFICE
CERTIFICATE OF CORRECTION

PATENT NO. : 6,732,515 B1
DATED : May 11, 2004
INVENTOR(S) : Weiland et al.

It is certified that error appears in the above-identified patent and that said Letters Patent is hereby corrected as shown below:

Column 15,
Line 17, after the word "configured", please insert the word -- to --

Column 16,
Line 61, after the word "configured", please insert the word -- to --

Signed and Sealed this

Twenty-seventh Day of July, 2004

JON W. DUDAS
*Acting Director of the United States Patent and Trademark Office*